March 28, 1939. W. M. HANNEMAN 2,152,591
SCREW AND WASHER ASSEMBLING MACHINE AND METHOD
Filed Feb. 17, 1937 9 Sheets-Sheet 1

Inventor
Walter M. Hanneman
By: Cox & Moore attys.

March 28, 1939.  W. M. HANNEMAN  2,152,591
SCREW AND WASHER ASSEMBLING MACHINE AND METHOD
Filed Feb. 17, 1937  9 Sheets-Sheet 4

Inventor
Walter M. Hanneman
By:- Cox & Moore attys.

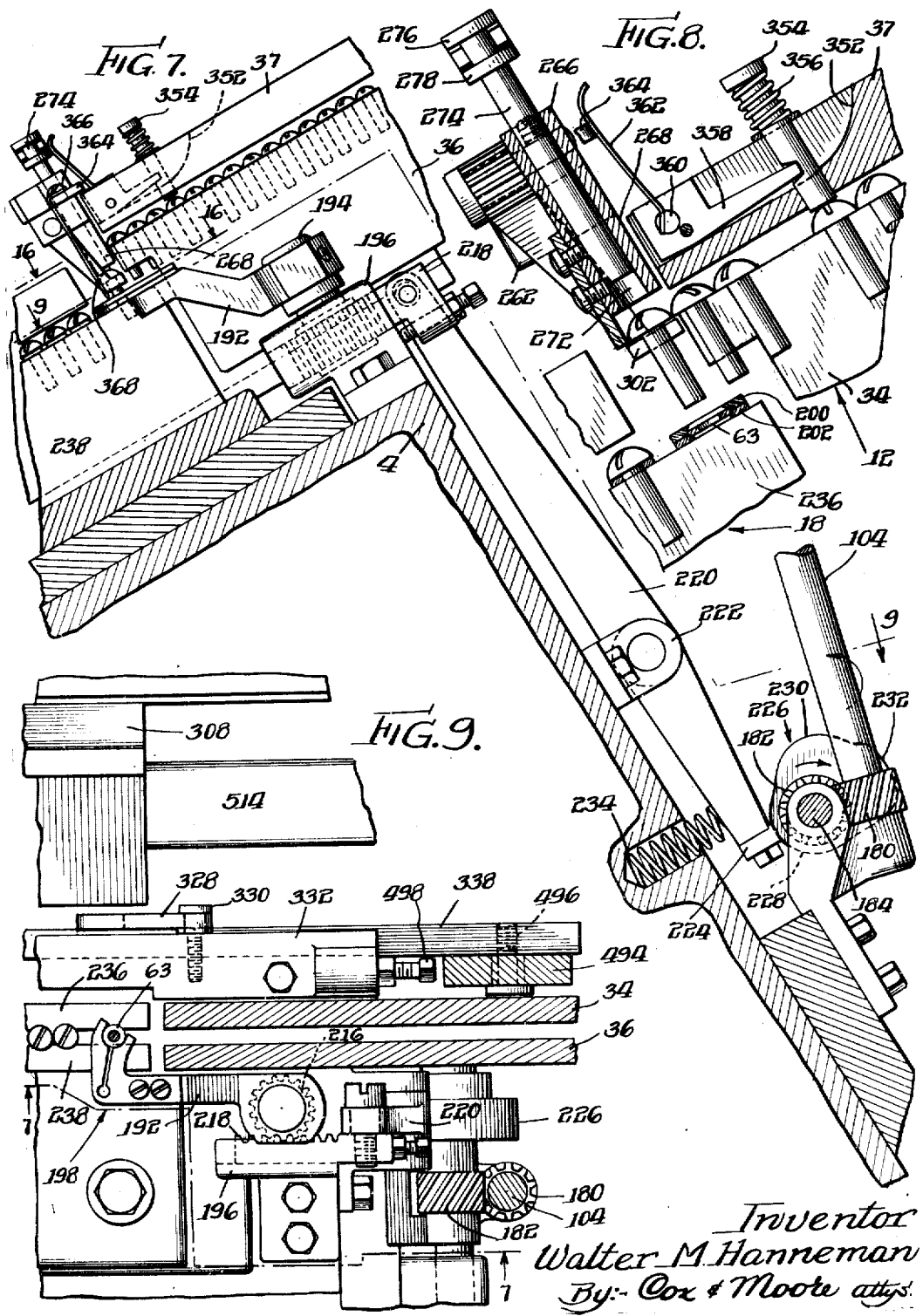

March 28, 1939.  W. M. HANNEMAN  2,152,591
SCREW AND WASHER ASSEMBLING MACHINE AND METHOD
Filed Feb. 17, 1937  9 Sheets-Sheet 6
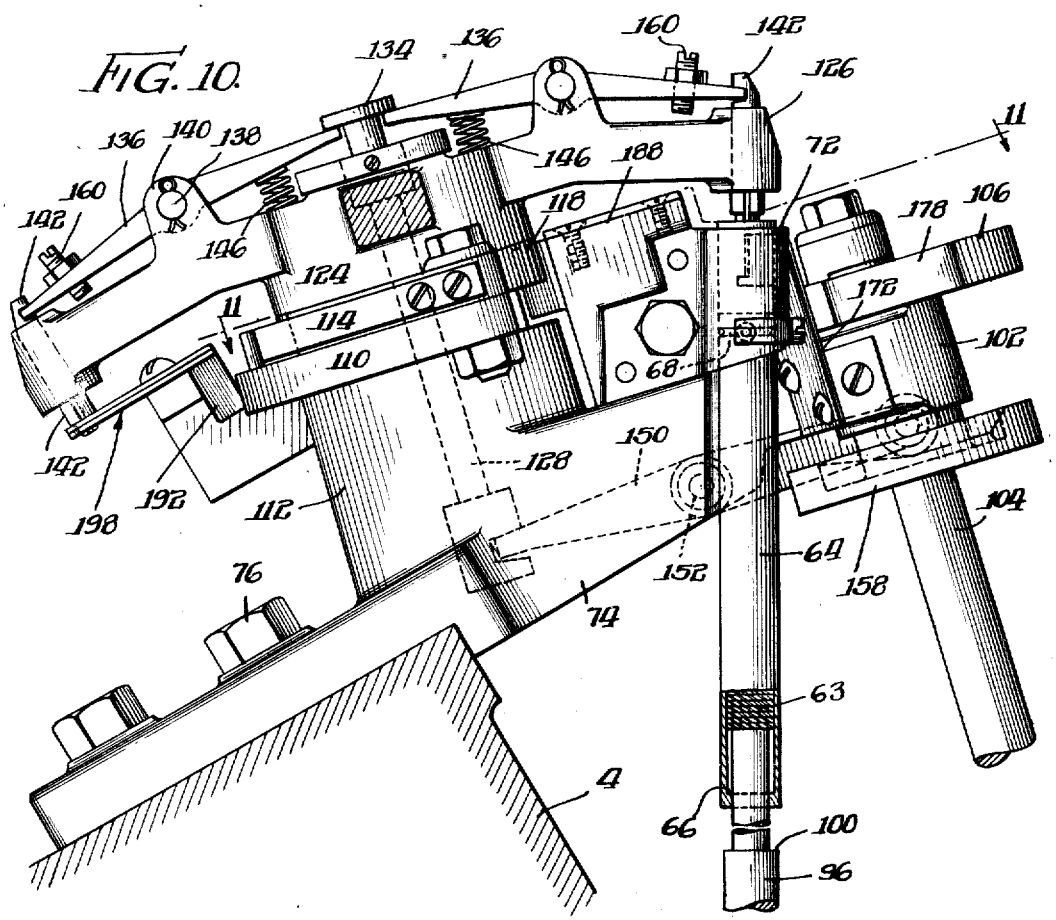
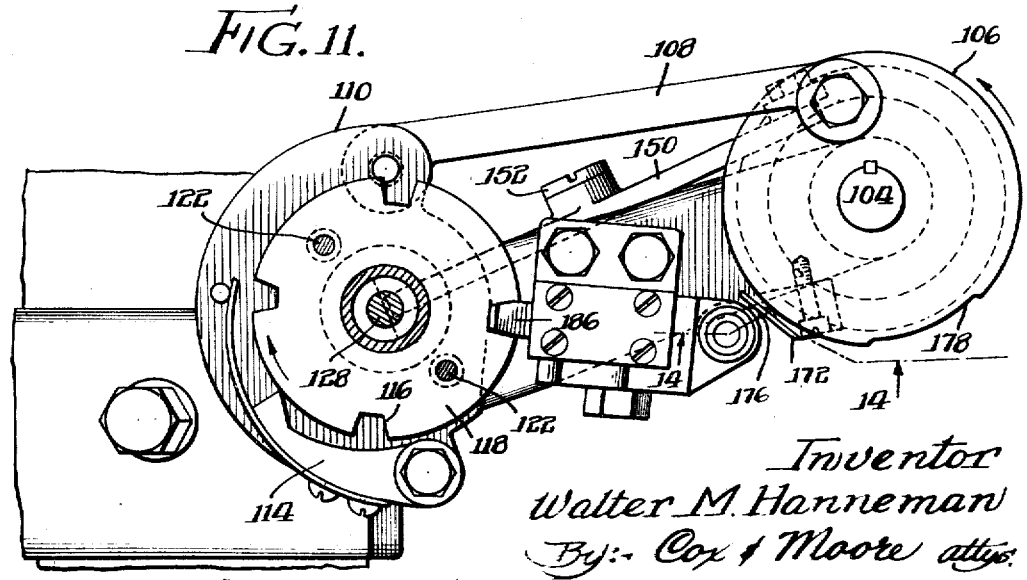
Inventor
Walter M. Hanneman
By: Cox & Moore attys.

March 28, 1939.  W. M. HANNEMAN  2,152,591
SCREW AND WASHER ASSEMBLING MACHINE AND METHOD
Filed Feb. 17, 1937  9 Sheets-Sheet 7
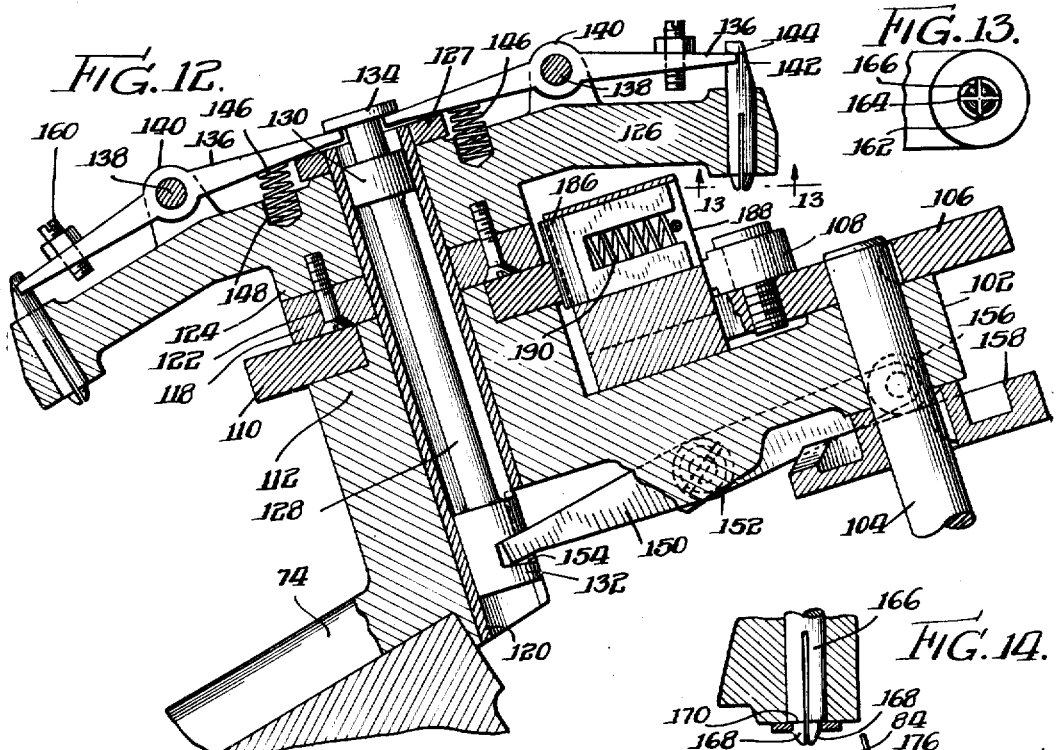
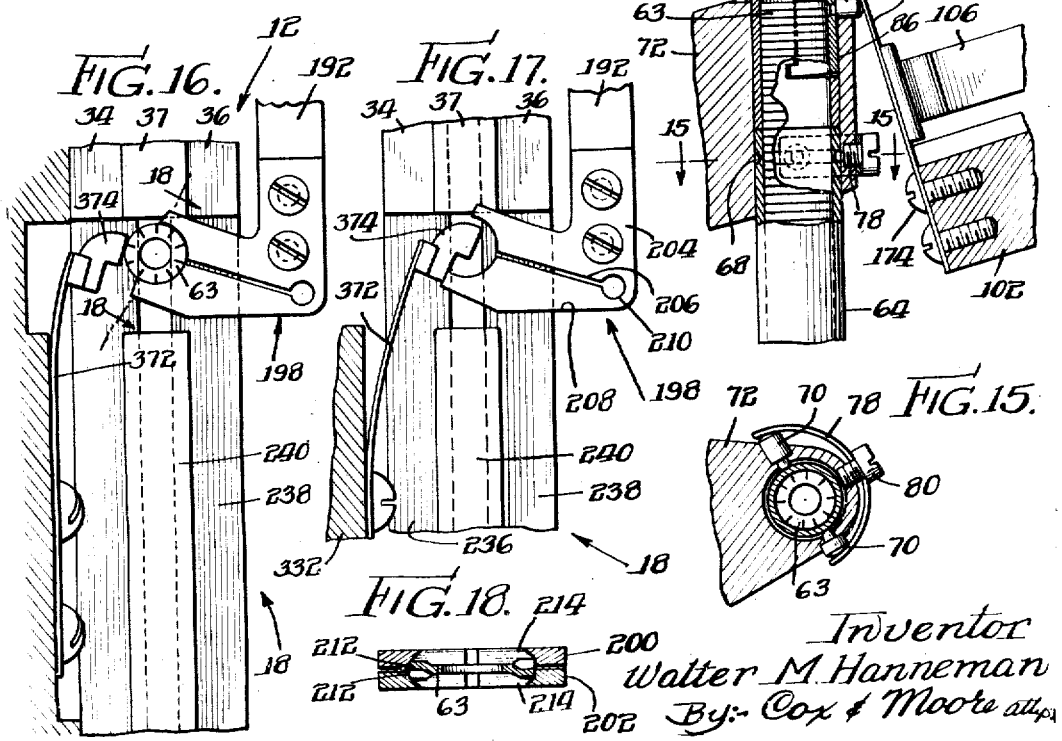
Inventor
Walter M. Hanneman
By:- Cox & Moore attys March 28, 1939.  W. M. HANNEMAN  2,152,591
SCREW AND WASHER ASSEMBLING MACHINE AND METHOD
Filed Feb. 17, 1937  9 Sheets-Sheet 9
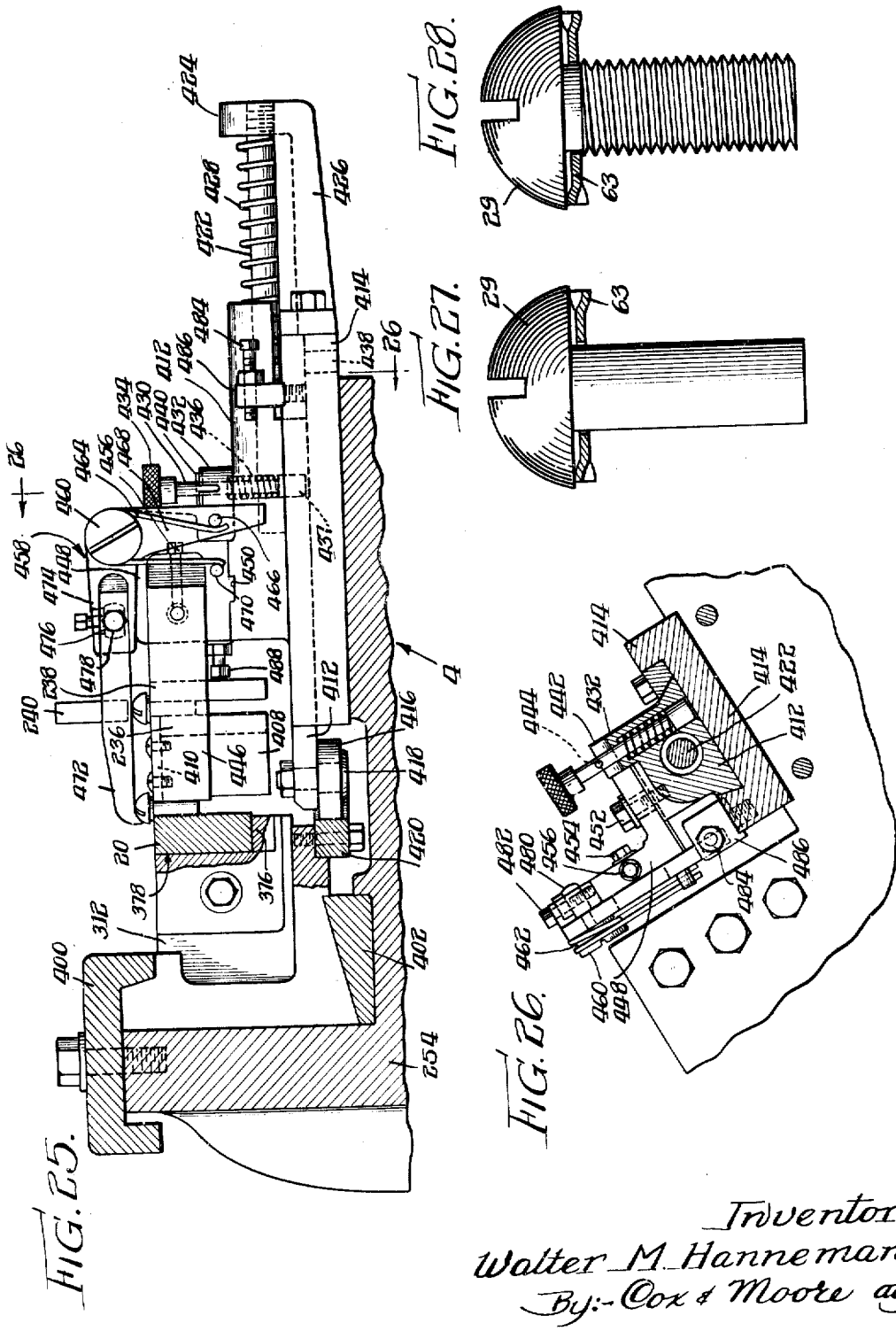
Inventor
Walter M. Hanneman
By:- Cox & Moore attys Patented Mar. 28, 1939

2,152,591

UNITED STATES PATENT OFFICE 2,152,591

SCREW AND WASHER ASSEMBLING MACHINE AND METHOD

Walter M. Hanneman, Oak Park, Ill., assignor to Illinois Tool Works, Chicago, Ill., a corporation of Illinois Application February 17, 1937, Serial No. 126,292

58 Claims. (Cl. 10—2)

This invention relates to a method and machine for assembling screws and washers.

It is an object of this invention to devise a method of handling screws and washers, particularly lock washers, which shall reduce to a minimum the cost of fastening two or more work pieces together by means of these elements.

It is another object of this invention to provide a method and a machine for assembling screws and washers which shall so anchor a washer to a screw that the assembly may be handled thereafter as a unit.

It is well known that by the rolling process of forming threads on a screw blank, the surface material of the blank is projected outwardly in proportion to the depth that the ribs of the thread-rolling die cut into the blank, and therefore the diameter of the finished screw is greater than the diameter of the original blank. It has heretofore been proposed to take advantage of this increase in diameter for the purpose of retaining a washer on a screw by placing the washer on the screw blank prior to the rolling of the threads. It is accordingly a further object of this invention to provide a machine for assembling washers and screw blanks and, while retaining the blank and washer in assembled relation, rolling the threads thereon to thereby produce, as an article of manufacture, a permanent unit assembly of screw and washer.

It is a further object of this invention to devise a method for producing, as an article of manufacture, a unit assembly of a screw and a washer.

A further object of the invention is to provide a method of, and a machine for, selecting and conveying individual washers from a receptacle containing a number of washers.

A further object of the invention is to devise a method of, and a machine for, feeding screw blanks and washers in proper juxtaposition and alinement for assembly.

Other objects and advantages of this invention will be apparent from the following detailed description, which, taken in connection with the accompanying drawings, discloses the method and machine of a preferred form of the present invention.

Fig. 7 is a vertical section and elevation taken along the line 7—7 of Fig. 9.

Fig. 8 is a fragmentary vertical section taken along the line 8—8 of Fig. 5.

Fig. 9 is a fragmentary horizontal section taken along the line 9—9 of Fig. 7.

Fig. 10 is a vertical section taken along the line 10—10 of Fig. 4.

Fig. 11 is a substantially horizontal section taken along the line 11—11 of Fig. 10.

Fig. 12 is a vertical section taken along the line 12—12 of Fig. 4.

Fig. 13 is a detail of a part of the mechanism of Fig. 12 and is taken along the line 13—13 of said Fig. 12.

Fig. 14 is a vertical section taken along the line 14—14 of Fig. 11.

Fig. 15 is a horizontal section taken along the line 15—15 of Fig. 14.

Fig. 16 is a plan view and horizontal section taken along the line 16—16 of Fig. 7.

Fig. 17 is a view similar to Fig. 16 showing the parts under a different condition of operation.

Fig. 18 is a substantially vertical section taken along the line 18—18 of Fig. 16.

Fig. 19 is a substantially vertical section taken along the line 19—19 of Fig. 4, with certain parts being broken away for the purpose of clarity.

Fig. 20 is a vertical section similar to Fig. 19 with the parts in a different position of operation.

Fig. 21 is a view similar to Figs. 19 and 20 but with the parts in a still different position of operation.

Fig. 22 is a substantially horizontal section taken along the line 22—22 of Fig. 19.

Fig. 23 is a substantially horizontal section taken along the line 23—23 of Fig. 20.

Fig. 24 is a substantially horizontal section taken along the line 24—24 of Fig. 21.

Fig. 25 is a substantially vertical section taken along the line 25—25 of Fig. 4.

Fig. 26 is a substantially vertical section taken along the line 26—26 of Fig. 25.

Fig. 27 is a vertical elevation of a screw blank and lock washer assembly prior to the rolling of threads on the blank.

Fig. 28 is a vertical elevation similar to Fig. 27 but with the threads rolled on the blank.

Figures 1, 2:
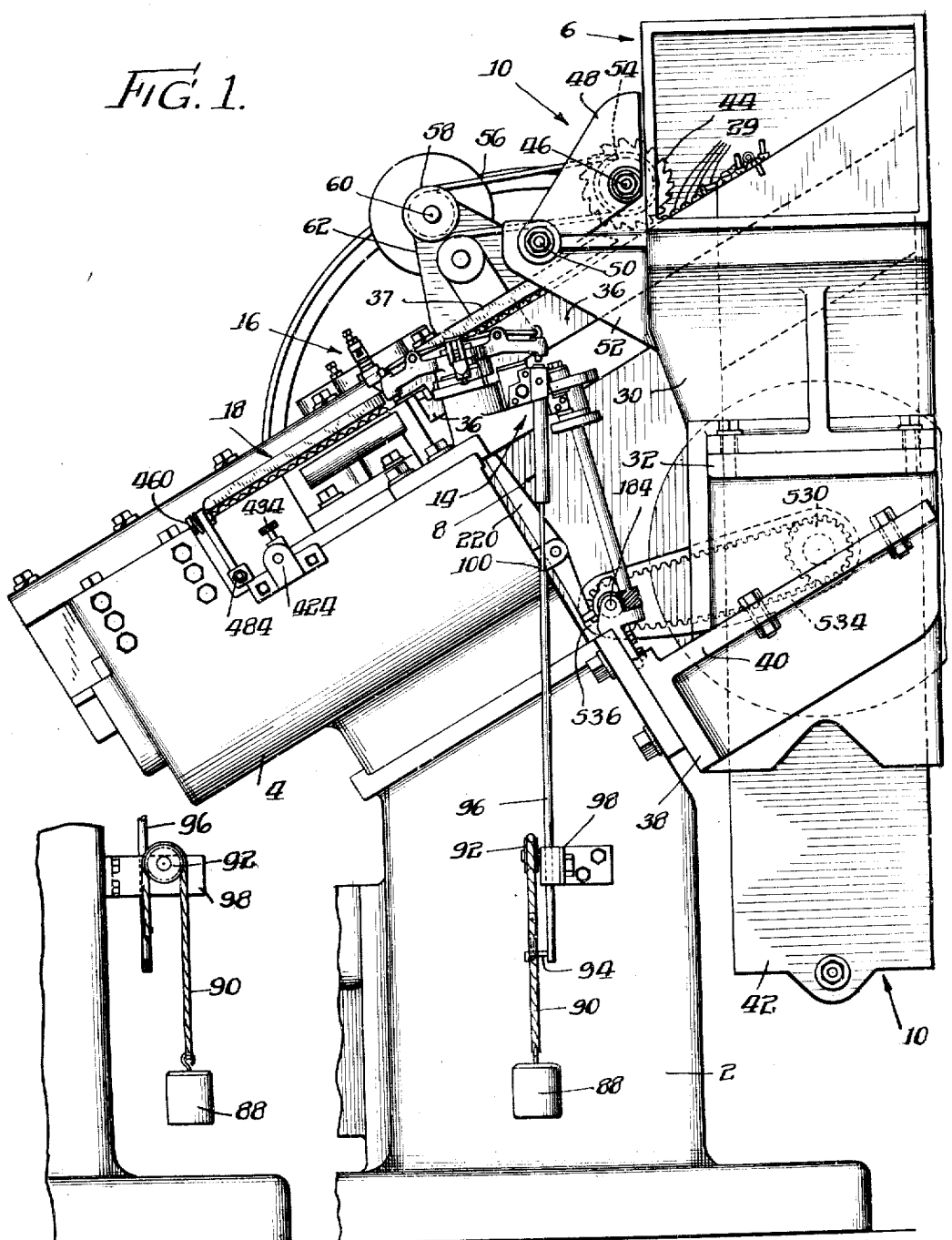
Fig. 1 is a side elevation of a machine embodying my invention.
Fig. 2 is an elevation of a part of the machine taken at right angles to Fig. 1.

As shown in the drawings, the machine, which forms one embodiment of the present invention, comprises a main base, or pedestal 2; an auxiliary base, or body, 4 secured to pedestal 2 at an angle of approximately 30 degrees to the horizontal; a hopper or container 6 for supplying screw blanks; a container or cartridge, 8 for supplying washers; a screw bank feeding mechanism 10 for discharging blanks from the hopper 6 onto an inclined guide chute 12; a washer feed mechanism 14; an assembly mechanism 16; an inclined guide chute 18 for the screw blank and washer assembly, a pair of thread-rolling dies 20 and 22; a transfer mechanism 24 for moving the blank and washer to the thread-rolling dies; a starter mechanism 26; and a driving mechanism 28.

Quantities of screw blanks are dumped or massed in the hopper 6 and quantities of lock washers are stacked in the container or cartridge 8. From their respective containers the screw blanks and washers are moved or fed, by the feed mechanism 14 and the guide chute 12, along predetermined paths into juxtaposition with the shank of each screw blank in vertical alinement with the central hole of a lock washer; the lock washer is held stationary while the assembly mechanism 16 presses or forcibly inserts the screw blank partially into the washer; the lock washer is then released and the screw blank, under the pressure of the assembly mechanism, is forced downwardly until the head of the screw blank engages the washer. After assembly the screw blank and washer are fed to the thread rolling dies 20 and 22 where, in the forming of the threads, the surface material of the blank is projected outwardly and permanently retains the lock washer and screw in assembled relation.

It will be apparent from this description and from the following detailed description of the machine that applicant's method of, and machine for, assembling screw blanks and washers advantageously may be employed to assemble threaded screws and washers where the screw is provided, above the threaded portion, with an outwardly tapering portion for frictionally retaining the washer. In such case, the threads would be formed on the screw prior to assembly with the washer and the thread forming mechanism could then be eliminated from the machine or arranged in advance of the assembly mechanism.

*The hopper and feed mechanism for the screw blanks*

Figure 3:
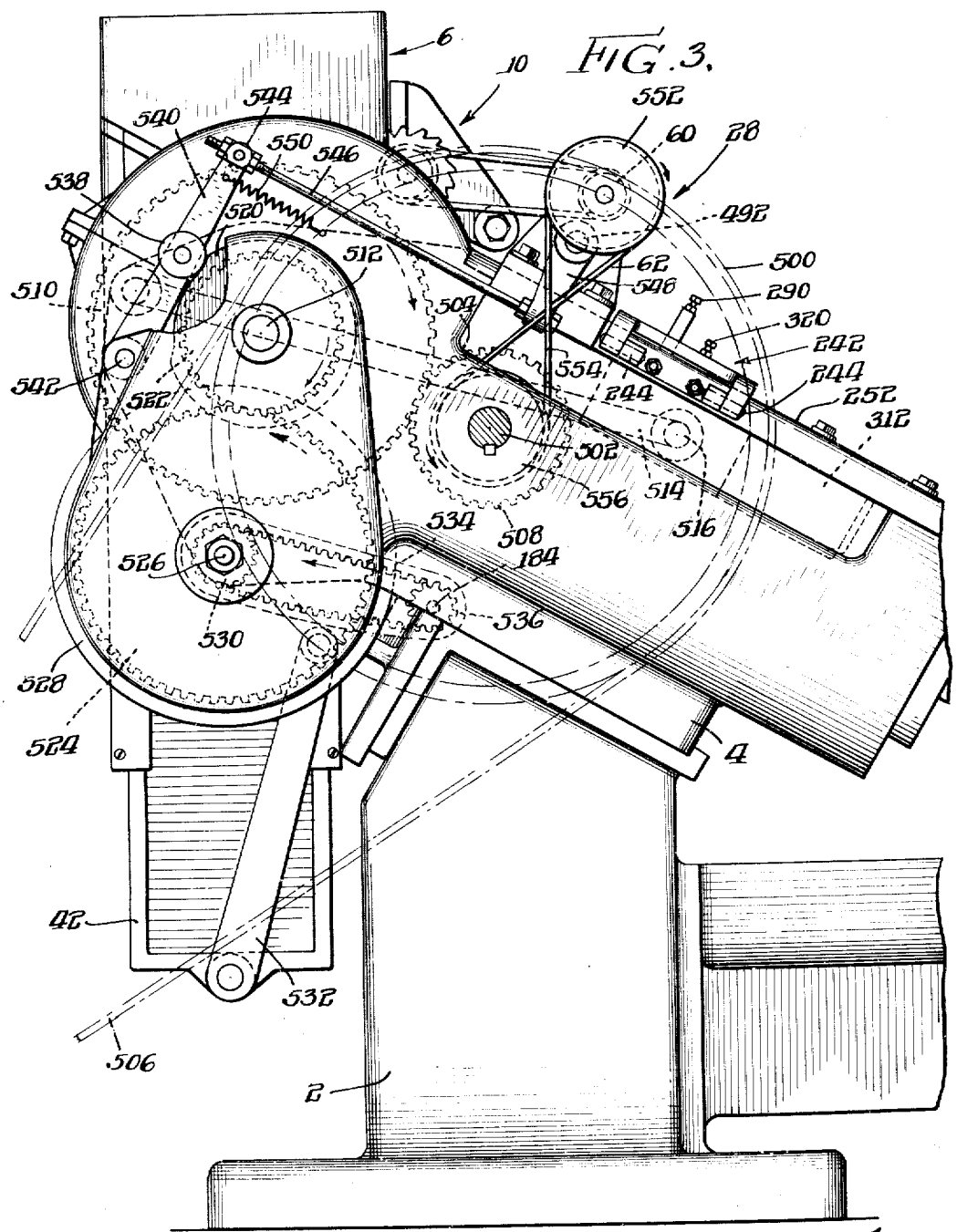
Fig. 3 is a vertical elevation of the opposite side of the machine from that of Fig. 1.
Figure 4:
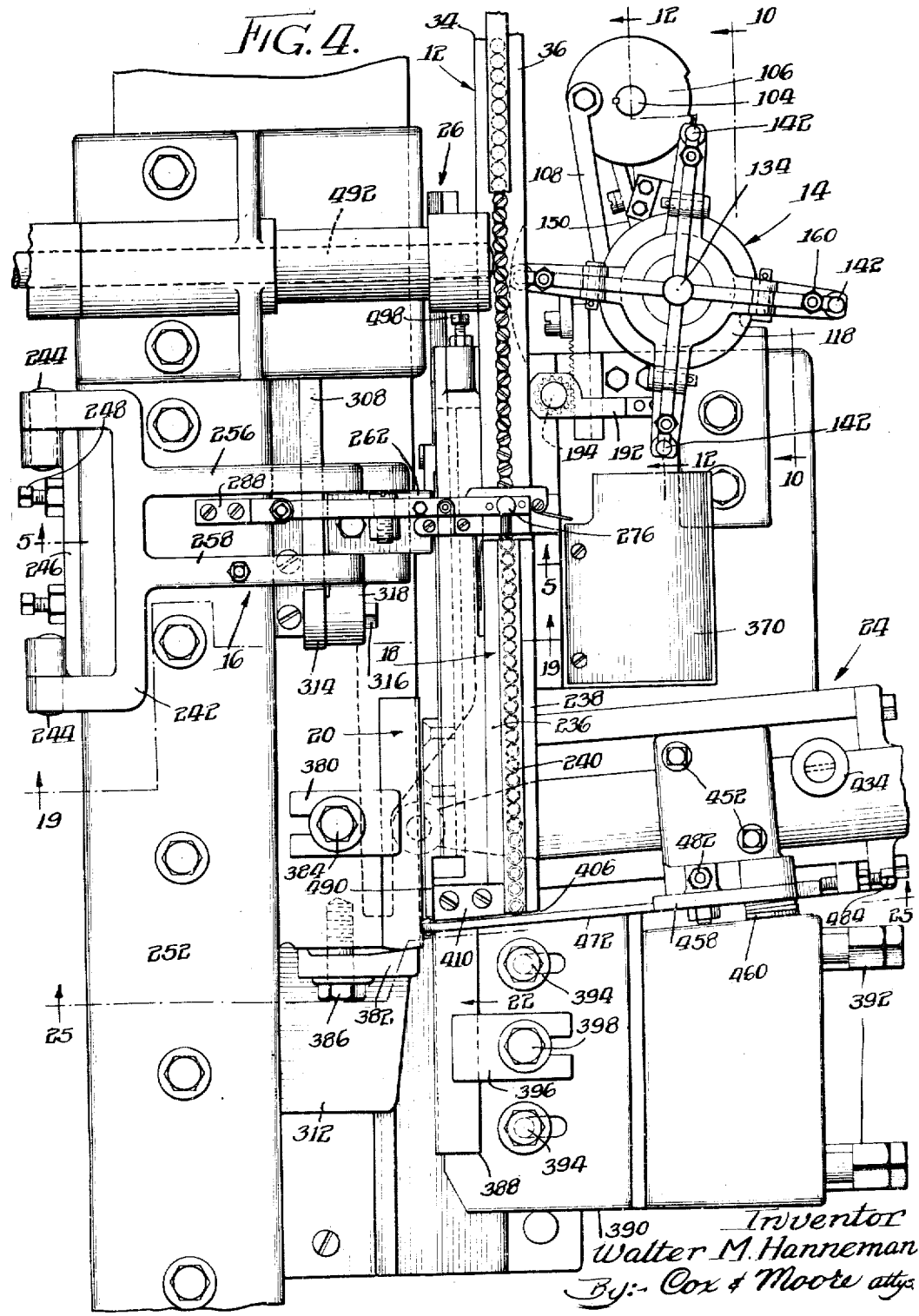
Fig. 4 is a plan view showing a portion of the machine.

As shown in Figs. 1, 3 and 4, the hopper or container 6 and feed mechanism 10 for the screw blanks 29 comprise a hopper casting 30 mounted on a casting 32 for adjustment at right angles to the guide chute 12, which is formed by bars 34 and 36 which are spaced apart to provide between them a slot for the shanks of the screw blanks. The bar 34 is mounted at its opposite ends in supporting brackets (not shown) secured to the body 4 and to the rear of the hopper 30. The bar 36 is mounted upon the supporting brackets for the bar 34 in any conventional manner to permit adjustment toward and from the bar 34 to accommodate screw blanks having shanks of different sizes and a cover plate 37, which overlies the chute 12, is secured in any convenient manner to the bar 36 for vertical adjustment to accommodate screws having different sized heads.

The casting 32 is adjustably mounted upon a casting 38 for adjustment along an inclined plane 40 parallel to the plane of inclination of the body 4, and the casting 38 is mounted upon the rear of the base, or pedestal 2, in a manner to permit adjustment of said casting 38 at right angles to the body 4.

Slidably mounted in guideways formed in the hopper casting is a reciprocating plate 42, which, as it moves upwardly, picks up screw blanks from the mass of blanks in the hopper and drops them into the chute 12. A clearing device, or ratchet, 44, which is secured to a shaft 46 mounted in a bracket 48, overlies the chute 12 and extends into the hopper 6 to assure an uninterrupted procession of blanks down the chute and to prevent clogging of the passage to the hopper. The bracket 48 is adjustably mounted by a stud 50 on an arm 52 projecting forwardly from the hopper casting 30. The clearing device is rotated by means of a pulley 54 secured to the shaft 46, and the pulley 54 is driven by a belt 56 which passes over a sheave 58 secured to a shaft 60 rotatably journaled in a bracket 62 supported upon the body 4.

*The container and feed mechanism for the washers*

As shown in Figs. 1, and 10 to 14, the container 8 for supplying the lock washers 63 comprises a cartridge, or cylinder, 64 having an open upper end and a lower end having an annular flange 66 projecting inwardly a slight distance to prevent the washers from dropping out the bottom of the cartridge. Adjacent its upper end the cartridge 64 is provided with a circumferential groove 68 to engage plungers 70 slidably mounted in a rearwardly projecting arm 72 of a casting 74 secured by bolts 76 to the body 4. A spring steel member 78 engages the ends of the plungers 70 and is secured to the arm 72 by a set screw 80. It will be apparent that the spring steel member 78 urges the plungers 70 into yieldable frictional engagement with the cartridge 64 to detachably secure the same to the arm 72. Mounted in the arm 72 in alinement with the cartridge 64, is a fixed tube, or cylinder, 82 having a cut-away portion 84 into which is inserted a complementary annular member 86 of slightly less circumference and height than the opening 84. The member 86, when in the tilted position shown in Fig. 14 is urged into frictional locking engagement against the periphery or external teeth of the top washer and prevents movement of the washer out of the open upper end of the tube 82.

A weight 88 (Figs. 1 and 2) is secured by a cable 90 passing over a pulley 92 to a forwardly extending lug 94 formed on a rod 96 guided in the bracket 98 secured to the pedestal 2. The upper end of the rod 96 is reduced in diameter and extends into the cartridge 64 in engagement with the lowermost washer of the stack of washers in said cartridge. The weight 88, acting through the rod 96, normally urges the washers upwardly in the cartridge against the member or wedge 86. It will be seen that the upward movement of the rod 96 is limited by the engagement of its shoulder 100 with the lower edge of the cartridge 64.

As shown in Figs. 1, 4, 7 and 9 to 18, the washer feed mechanism comprises the casting 74, and this casting has, in addition to the cartridge supporting arm 72, a second rearwardly extending arm 102 in which is journaled a shaft 104. The shaft 104 carries at its upper end a disk 106 which is connected by a pitman 108 to a cam 110.

loosely journaled on a hub portion 112 of the casting 74. A spring-pressed pawl 114 pivotally mounted upon the cam 110 is adapted to engage notches 116 in an index wheel or ratchet 118 superimposed on the cam 110 and loosely journaled on a hollow shaft or tube 120, non-rotatably secured to and passing through the portion 112 of the casting 74. The index wheel or ratchet 118 is connected by screws 122 to the hub portion of a spider 124 having four arms 126 in vertical alinement with the notches 116 in the ratchet 118. The spider 124 is loosely journaled on the tube 120 and is secured thereto against axial movement by a nut or collar 127. Within the tube 120, there is slidably mounted a rod 128 having enlarged guide portions 130 and 132 engaging the tube for guiding the rod in its vertical movements. The rod 128 is provided at its upper end with an enlarged head 134 which engages the inner ends of four levers 136 overlying the arms 126 and pivotally connected by studs 138 to lugs 140 projecting upwardly from said arms.

At their outer ends the levers 136 carry pick-up pins 142 which are slidably mounted in the arms 126 at the outer ends thereof, and are provided with recesses 144 into which the levers 136 extend. Each lever 136 is urged in one direction by a spring 146 mounted in a recess 148 in the upper surface of the spider 124. The levers 136 are simultaneously rotated in an opposite direction against the action of the springs 146 by the rod 128, which is operated by a lever 150 pivoted by a stud 152 to the arm 102 of the casting 74. The inner end of the lever 150 engages in an aperture 154 in the guide portion 132 of the rod 128, and the outer end of the lever is provided with a roller 156 for engaging the cam groove of an internal cam 158 secured to the shaft 104. As the cam 158 rotates with the shaft 104, the roller 156 in moving upward in the groove of the cam will rotate the lever 150 counterclockwise to move the rod 128 downwardly, and the rod 128 will be moved upwardly as the roller 156 descends into the cam groove, under the action of the springs 146 by means of the levers 136 acting against the head 134 of the rod. Adjustable set screws 160 threaded in the levers 136 are provided for the purpose of limiting the rotation of the levers relative to the arms 126.

As shown in Figs. 12, 13 and 14, the lower half of each pick-up pin 142 is divided into quadrants, or prongs, 166 by intersecting slots 162 and 164. Each prong portion carries at its lower end a tapering tip 168 which terminates in a shoulder 170. As the pin 142 descends into the tube 82, the tapering tips of the prongs 166 engage in the central hole of the washer and are forced inwardly thereby and held in engagement with the washer by the inherent resiliency of the prongs. The shoulder 170 limits the inward movement of the prongs relative to the washer and engages the upper surface of said washer.

A spring steel member 172, secured by bolts 174 to the arm 102, is held by the disk 106 in engagement with a pin 176 secured to the wedge 86 and slidably mounted in the arm 72. Upon each rotation of the disk 106 a peripheral notch 178 permits the spring member 172 to release the wedge 86, and the release of the wedge 86 allows the washers to be moved upwardly in the cartridge 64 and tube 82 by the weight 88 and permits the removal of a washer by the pick-up pin 142. As the pick-up pin 142 is moved upwardly by the cam 158, the washer is removed from the cartridge, and, upon engagement of the pawl 114 with a notch 116 in the index wheel 118, the spider 124 will be rotated by the disk 106 a quarter revolution to aline a succeeding pin 142 with the tube 82.

The shaft 104, to which the disk 106 and cam 158 are secured, is connected at its lower end by gears 180 and 182 to a shaft 184 of the driving mechanism 26, later to be described.

A stop member 186 is slidably mounted in a bracket 188 secured to the arm 102 of the casting 74 and is normally urged by a spring 190 into engagement with one of the notches 116 in the index wheel 118. This stop member is moved rearwardly by the cam 110 to effect the release of the index wheel from said stop member. The surface of the cam 110 is so formed that the member 186 will be released to engage a notch 116 upon each quarter rotation of the index wheel, thereby providing a positive limitation upon the movement of the index wheel 118 and the spider 124.

A transfer lever 192, as best shown in Figs. 4, 7 and 9, is secured to a stub shaft 194 journaled in a bracket 196 secured to the body 4 inwardly of the casting 74. At its outer end the transfer lever carries a spring steel transfer finger 198 bolted thereto. The transfer finger 198 comprises two superimposed, spring steel, angular members 200 and 202 bolted to lever 192 along the arm portion 204 and are provided with a common slot 206 extending longitudinally of the arm 208 and terminating in a circular opening 210 at the inner end of the arm 208.

Prior to assembly the outer end of each of the members 200 and 202 is drilled to provide a semicylindrical aperture 212 and a frustro-conical aperture, or countersunk portion 214 mating with the semicylindrical portion 212, as best shown in Fig. 18. The semicylindrical portion 212 is of a depth slightly less than half the width of the lock washer and the members 200 and 202 are assembled in such relation that the semicylindrical apertures 212 are in registry one with the other.

In transferring a washer from the pick-up pin 142, the transfer finger is swung by the lever 192 into engagement with the washer carried by said pin. The washer being held stationary while the finger moves into alinement with the pin, it will be forced inwardly of the aperture at the end of the transfer finger and the semicylindrical portions 212 being of a combined height slightly less than the width of the washer, the members 200 and 202 will be sprung slightly apart to thereby frictionally retain the lock washer therebetween.

It should also be noted in this connection that the diameter of each semicylindrical portion 212 is also slightly less than the external diameter of the washer and hence each member 200 and 202 also will be sprung apart laterally at its open end and provide a frictional retaining force acting radially of the washer.

The stub shaft 194 carries at its lower end a pinion 216 which is driven by a rack 218 slidable in guideways formed in the bracket 196, and at its outer end the rack is pivotally connected by a pin and slot connection to a vertical lever 220. The lever 220 is pivoted intermediately its ends upon a bracket 222 secured to the rear of the body 4, and at the lower end of the lever there is secured a cam follower 224 for engaging the cam 226 rotatably secured to the shaft 184.

The cam 226 comprises three circular surfaces or dwell portions 228, 230 and 232 of different diameters joined by connecting or active portions, and causes the transfer lever 192 to move in the following manner. First, with the follower 224 in engagement with the circular portion 228 of the cam, the lever 192 will be in its extreme position in a clockwise direction, as shown in Figs. 9 and 16. As the cam rotates in a clockwise direction (as seen in Fig. 7), the lever 192 will be rotated in a counterclockwise direction and, as the follower 224 engages the dwell 232, the lever 192 will have assumed the extreme position shown in Fig. 4. Upon continued rotation of the cam, the lever 192 will be quickly rotated or snapped in a clockwise direction to the position shown in Fig. 10, wherein the end of the transfer finger surrounds the washer carried by the forward pick-up pin 142. The transfer lever will remain in this position during the time that the follower is in engagement with the dwell 230, and, the pick-up pin being raised during this period, the lever 192 will be thereafter moved in a clockwise direction to again assume its extreme position shown in Figs. 9 and 16.

The operation of the washer feed mechanism will now be described. With the parts of this mechanism in the position shown in Fig. 4, the spider or selector 124 will momentarily be held stationary with the rearmost pick-up pin or selector 142 in the position shown in Fig. 10 to which it will have been moved to select the topmost washer of the stack of washers in the manner previously described. It will be assumed that the foremost pick-up or selector pin 142 has previously selected a washer from the cartridge 64 and has retained the washer thereon during a half revolution of the spider or selector 124.

While the selector momentarily remains stationary, the cam 226 will cause the transfer lever 192 to move through its cycle of operations as follows. The cam follower 224, Fig. 7, in passing from the dwell portion 232 to the dwell portion 230 of the cam 226 will operate the transfer lever 192 and cause the transfer finger 198 to engage the washer held by the foremost pick-up pin, in the manner previously described. During the time that the follower 224 passes over the dwell portion 230, the lever 192 remains stationary but the cam 158 (Fig. 10) moves the lever 150 counterclockwise to simultaneously raise all the selector pins 142. The rearmost selector pin removes the selected washer from the cartridge 64 and the foremost pin releases its associated washer to the tarnsfer finger 198. The follower 224 then passes from the dwell portion 230 to the dwell portion 228 of the cam 226 and the transfer lever 192 is thereby further rotated in a clockwise direction to the position shown in Figs. 9 and 16, wherein the washer held in the finger 198 is at the upper end of the guide chute 18 with its hole in alinement with the slot in this guide chute and is in position for assembly with a screw blank. During the time that the follower 224 passes over the dwell portion 228, the assembly mechanism (later to be described) operates to remove the washer from the transfer finger 198 and following its removal the follower 224 passes from the dwell portion 228 to the dwell portion 232 to rotate the transfer lever in a counterclockwise direction to its original position wherein the outer end of the transfer finger 198 is spaced slightly to the rear of the path of the foremost pick-up pin 142. As the cam follower passes over the dwell portion 232, the spider or selector 124 is rotated a quarter of a revolution by the shaft 104, in a manner previously described, to thereby aline a succeeding pin with the stack of washers in the cartridge 64 and to place the diametrically opposite pin in the foremost position.

*The assembly mechanism*

The purpose of this mechanism, which is shown in detail in Figs. 4 to 9 and 19 to 24, is to pick the foremost screw blank from the chute 12, insert it into the washer carried by the transfer finger 198 of the washer feed mechanism, and deposit the assembly on the inclined guide chute 18. The inclined guide chute 18 is similar in construction to the guide chute 12 and comprises a bar 236 mounted upon a bracket 237 fixedly secured to the body 4, and a bar 238 adjustably secured to the bracket 237 by a bolt 239 passing through an enlarged opening 241 in a bracket 243 (Fig. 5) for movement toward and from the bar 236. The lower ends of the spaced bars 34 and 36 of the upper chute 12 may be similarly secured to the brackets 237 and 243. A cover plate 240, similar to the cover plate 37, overlies the chute 18 and is secured in any convenient manner to the bar 238 for vertical adjustment relative to said bar to accommodate screws having different sizes of heads. The chute 18, as will be clearly seen from Figs. 1, 7 and 8, is spaced vertically below the chute 12 and the upper ends of the bars 236 and 238 terminate in cut-out portions of the bars 34 and 36 with the slots between the bars of the two chutes in alinement as shown in Fig. 9.

The assembly mechanism 16 comprises a frame 242 pivotally mounted by studs 244 on a bracket 246 which is adjustably secured by bolts 248 to the depending flange 250 of a cover plate 252 bolted to the upstanding arm 254 of the body casting 4. The frame 242 comprises spaced legs 256 and 258, which, at their outer ends are bent downwardly and integrally connected by a plate 260, to which there is adjustably secured a projecting plate 262. Bolts 264, which pass loosely through enlarged apertures or slots in the plate 260, threadedly engage the plate 262 and secure the latter to the plate 260, and by virtue of the enlarged opening or slot permit adjustment of the plate 262 longitudinally of the frame. Adjacent its outer end the plate 262 is provided with upwardly and downwardly extending ears or arms 266 and 268 flush with the rear edge of the plate 262 and with the inner edge of a recess 270 cut inward from the front surface of the plate 262.

Slidably mounted in a bore 272 extending longitudinally of the ears or arms 266 and 268 is a plunger rod 274 having a head formed by spaced collars 276 and 278 for engaging the bifurcated end of a lever 280. The lever 280 is pivoted on an ear or lug 282 formed integrally with the plate 262 and extending vertically therefrom intermediate its ends. The inner end of the plate 262 is apertured to receive one end of a spring 284 which surrounds a pin 286 depending from the under surface of the lever 280, and at its upper end the spring bears against the lever 280 to urge the same in a clockwise direction. A Z-shaped bracket 288 is secured to the cover plate 252 between the spaced arms 526 and 258 and overhangs at its upper end the inner end of the lever 280. A set screw 290, secured in the overhanging end of the bracket 288, provides an adjustable stop for limiting the movement of the lever 280 in a clockwise direction.

On the front face of the ear or arm 266 within the recess 270, there is pivoted a pair of arms or fingers 292 and 294. The arm 292 forms the depending leg of a bell crank, of which the other arm or leg 296 overlies and extends inwardly of the plate 262. The arms 292 and 294 are connected for simultaneous rotation by gear segments 298 and 300 formed integrally with their respective arms. The arms 292 and 294 extend downwardly in a plane at an angle to the axis of the plunger 274 and are prevented from moving rearwardly by the beveled surface of the arm 268. At their bottom ends the arms 292 and 294 are provided with rearwardly extending fingers of jaws 302 and 304, and these jaws are provided with semicircular apertures in their meeting edges, permitting the jaws to engage the shank of a screw blank 29 and retain the same in position beneath the plunger 274. The alined apertures 305 in the plate 262 inwardly project springs 306 into engagement with the arms 292 and 294 to thereby yieldably urge the jaws into engagement with the screw blank.

The frame 242 is oscillated about its pivot pins 244 by a reciprocating cam bar 308 which is secured by bolts 310 to a reciprocatory bar or gate 312, and the cam engages a roller 314 journaled on a stud 316 carried by an ear 318 projecting forwardly from the leg 258 of the frame. An adjustable set screw 320 (Fig. 19) is carried by the arm 258 and engages the cover plate 252 to limit the downward movement of the frame under the action of gravity.

Beneath the arm 296 the plate 262 is provided with an aperture 322 through which passes a plunger cap 324. The plunger cap 324 slidably receives therein a plunger pin 326 which is rounded at its lower end to engage the upper surface of an L-shaped lever 328. The lever 328 is journaled on a stud 330 which is secured to the inner face of a cover, or guide bar, 332. The cover or guide bar 332 is bolted or otherwise secured to an upstanding leg of the bracket 237 and to the upstanding legs of similar brackets (not shown) similarly positioned with respect to the bar 236 forwardly of the bracket 237. The downwardly depending leg of the L-shaped lever 328 is beveled to engage the beveled surface of a cam plate 336 secured to the exterior face of a starter slide bar 338 journaled in the guideway formed by the cover bar 332 and recesses in the upstanding legs of the brackets 237 (of which one only is shown).

It will be apparent that upon forward reciprocation of the starter slide bar 338, the lever 328 will be moved upwardly about its mounting stud by the cam face of the plate 336, and that in moving upwardly the lever 328 will force the plunger pin 326 into its cap 324. Within the plunger cap a spring 340 is interposed between the head of the cap and the upper surface of the plunger pin, and this spring in the position shown in Figs. 5 and 20 normally retains the plunger cap in engagement with the under surface of the arm 296. Upon the upper surface of this arm 296 there is secured a bracket 342 which is provided with an upwardly extending arm 344 and a rearwardly extending arm 346 overlying the bifurcated lever 280. An adjustable set screw 348 passes through the rearwardly extending arm 346 and is provided at its lower end with a rounded surface to engage the lever 280 and limit the downward movement of the arm 296 relative to said lever. A similar adjustable set screw 350 passes through the lever 280 in a position to engage the upper surface of a stop pin 351 carried by the plate 262 and limit the downward movement of the lever 280 relative to said plate.

Mounted within a longitudinal slot 352 in the cover plate 37 for the chute 12 (Figs. 7 and 8), is a spring-pressed plunger 354 normally urged by its spring 356 out of engagement with bolts in the chute 12. This spring-pressed plunger 354 is positioned in the slot 352 rearwardly of the depending ear or arm 268 (Fig. 8) a distance slightly greater than the width of the heads of three screw blanks, so that with the arm 268 in a downward position (as shown in Fig. 8), the plunger will overlie the head of the fourth bolt from said arm. This plunger is operated by a bell crank 358, one arm of which extends into a recess in the front face of the plunger. The other arm of the bell crank 358 is provided with a pin 360 in a slot of which is pressed a spring strip 362, and the spring strip 362 is bent forwardly to engage at its upper end a cam 364 projecting rearwardly from the plate 262 and secured to the outer end thereof by a screw 366. It will be apparent that as the plate 262 is moved upwardly, the cam 364 will engage the spring strip 362 and force the plunger 354 downwardly against the action of the spring 356 into engagement with the head of the fourth screw blank and bind the same against the upper surface of the bars 34 and 36 to prevent clogging of the assembly mechanism.

Also secured to the plate 262 by the bolt 366 is a spring rod or wire 368, and this rod extends downwardly a sufficient distance to engage the circular opening 210 of the transfer finger. As the transfer finger 198 is rotated counterclockwise (Figs. 4, 16 and 17), the end of the rod 368 will pass outwardly of the finger through the slot 206. If a washer has been retained in the transfer finger due to the absence of a screw blank in the assembly mechanism, the rod 368 will detach the same from the transfer finger. A pan 370, secured to the side of the body 4 beneath the rod 368, is provided to receive the washer under such circumstances.

Washer detecting means are provided for preventing the feeding of a screw blank by the assembly mechanism when there is no washer in the transfer finger 198. This means comprises a spring strip 372 secured in a recess in the outer face of the cover plate 332. This spring member carries at its outer end an L-shaped stop member 374, the base of which normally engages the periphery of a washer carried by the transfer finger, but which, in the event that there is no finger in the transfer finger, will project into the washer receiving aperture 212—214. The inwardly extending arm of the L-shaped lever will then engage the outer end of the transfer finger to position the base of said member in vertical alinement with the screw blank in the jaws 302 and 304, to thereby prevent the feeding of a washerless screw blank to the chute 18.

The operation of this assembly mechanism (as shown in Figs. 7, 8, and 19 to 21) is as follows. As the reciprocating cam 308 moves forwardly, the frame 242 will be oscillated upwardly about its pivot pins 244. The lever 280 moves upwardly with the frame and in so moving its outer end engages the set screw 290, being thereby rotated in a counterclockwise direction, raising the plunger rod 274, and through the set screw 348 and bracket 342 rotating the arms 296 and 292 in a clockwise direction. The arm 292 being connected to the arm 294 by the segments 298 and 300, the clockwise rotation of the arm 292 causes the counterclockwise rotation of the arm 294.

The movement of the lever 280 caused by the upward movement of the frame 242 and the set screw 250 will be such that the jaws 302 and 304 will be separated by a distance somewhat less than the diameter of the head of the screw blank 29. During this upward movement of the frame, the cam 364 attached to the plate 262 will engage the upper end of the spring strip 362 rotating the bell crank 358 in a clockwise direction as shown in Figs. 7 and 8, and forcing the plunger 354 downwardly against the action of the spring 356 into locking engagement with the screw blank positioned therebeneath.

Subsequent to the operation of the plunger 354, the lower edge of the ear or arm 268 will rise above the heads of the screw blanks to permit the leading blank in the guide chute 12 to be fed by gravity into the jaws 302 and 304, which, it will be noted, are slightly below the plane of the upper surface of that guide chute with the space between the jaws alined with the slot between the bars 34 and 36 of the chute. A washer, having been moved by the transfer lever 192 into a position wherein the central opening therein is directly over the slot between the bars 236 and 238 of the guide chute 18 and in alinement with the shank of the screw blank held in the jaws 302 and 304, the mechanism is now properly positioned for the assembling of the blank and washer.

Accordingly, when the cam 308 moves rearwardly, the frame 242 will be moved downwardly under the action of its own weight, the roller 314 rolling down the inclined surface of said cam. As the plate 262 moves downwardly with its supporting frame the spring 284 will rotate the lever 280 in a clockwise direction, lowering the plunger rod 274 into engagement with the head of a screw blank and permitting the springs 306 to rotate the jaws 302 and 304 into locking engagement with the shank of said screw blank. Simultaneously the screw blank carried by the jaws 302 and 304 is lowered into and passes through the central aperture in the lock washer 63, which is thereafter released from the transfer finger 198 and rests upon the upper surface of the guide chute 18, the shank of the screw blank passing downwardly between the chute bars 236 and 238. The mechanism, upon the continued downward movement of the frame 242, then assumes the position shown in Fig. 20 wherein the jaws 302 and 304 are spaced slightly above the washer and the plunger rod 274 is in engagement with the head of the screw blank held in said jaws.

Figure 6:
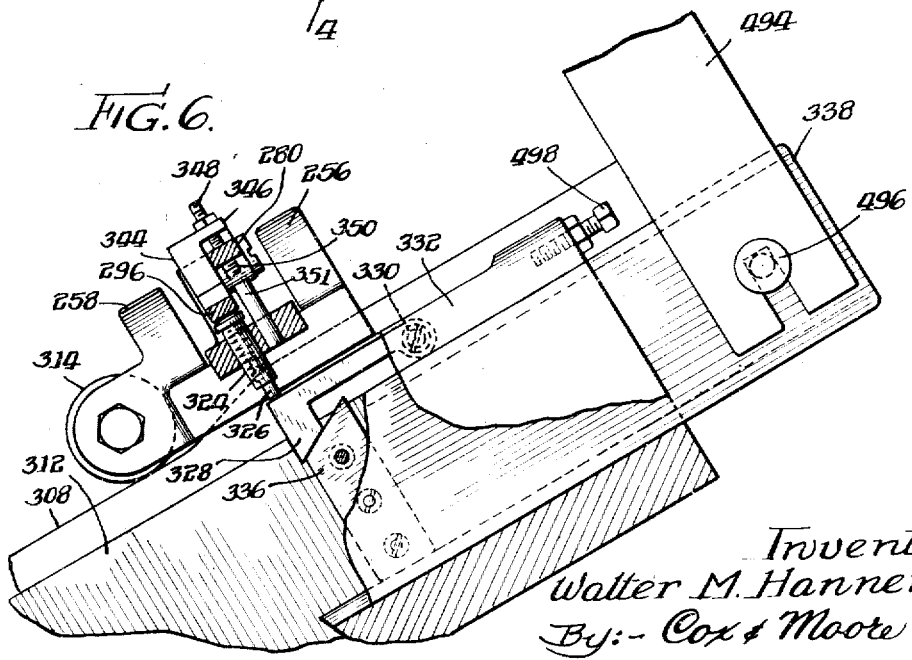
Fig. 6 is a fragmentary vertical section taken along the line 6—6 of Fig 5, with certain parts being broken away for purposes of clarity.

In this position of the mechanism the cam plate 336 is in the rearward position shown in Fig. 6 and the plunger cap 324 rests against the lower surface of the arm 296 and is held in engagement therewith by the springs 306 and 340. It will be noted in this connection that the set screw 350 is spaced slightly above the upper surface of the stop pin 351. When the starter slide 338 (Fig. 6) moves forwardly, the cam plate 336 attached thereto forces the L-shaped lever 328 and the plunger pin 326 upwardly, compressing the spring 340. The spring 340 overcomes the resistant force of the springs 306 and rotates the arms 292 and 294 outwardly to release the jaws 302 and 304 from the screw blank. When the jaws 302 and 304 have released the screw blank, the spring 284 will rotate the lever 280 in a clockwise direction to further lower the plunger 274 and force the screw blank downwardly to the position wherein the under surface of the head engages the upper surface of the washer and the shank of the blank extends through the hole in the washer and into the slot between the bars 236 and 238 of the guide chute 18. This downward movement of the plunger is limited by the engagement of the stop pin 351 with the set screw 350.

The parts are now in the position shown in Fig. 21 and thereafter, the reciprocating cam 308 will have been moved forwardly a sufficient distance to cause the assembly mechanism to assume the original position shown in Fig. 19, wherein the jaws 302 and 304 are in position to receive another screw blank. Prior to the time that the reciprocating cam 308 has moved to its furthermost forward position, the cam plate 336 will be moved rearwardly by the starter slide 338 to permit the plunger pin and cap 326 and 324, respectively, to assume the positions shown in Fig. 19, wherein the enlarged head of the plunger cap retains the pin and cap in position on the plate 262.

*The thread-rolling mechanism*

This mechanism (Figs. 4 and 25) comprises the reciprocating thread-rolling die 20 and an immovable thread-rolling die 22. The die 20 is mounted with a filler block 376 (Fig. 25) in a recess 378 in the inner face of the reciprocating member or gate 312 and detachably secured thereto by clamping plates 380 and 382 and bolts 384 and 386. The immovable thread-rolling die 22 and a filler block (not shown) similar to the filler block 376 are mounted in a block 390 adjustably mounted upon the body casting 4 by bolts 392 and 394 for movement toward and from the reciprocating die 20. A clamping plate 396 and bolt 398 detachably secure the immovable die 22 and filler block in the recess 388. The reciprocatory gate or member 312 slides in a guideway formed by the inner depending flange 400 of the cover plate 252, a beveled insert or jib 402 and the inner face of the upstanding arm 254 of the body casting 4.

In view of the adjustability of the block 390 and the detachability of the thread-rolling dies, it will be apparent that various sized dies and filler blocks may be employed to adapt the thread-rolling mechanism for different sizes of screw blanks.

In passing through the thread-rolling dies, the surface of the screw blank 29 is projected outwardly in proportion to the depth that the ribs of the thread-rolling die cut into the blank, and therefore the finished threaded screw becomes larger than the original blank, as shown in Figs. 27 and 28, and the outwardly projecting portions of the thread retain the washer 63 in assembled relation with the screw 29. From the dies, the screw with the washer attached thereto falls by gravity into a receiving pan (not shown), which may be secured to the base 2 and project outwardly beneath the outer edge of the inclined casting 4.

*Transfer mechanism*

This transfer mechanism 24 cooperates with a guide chute 406 in transferring the assembled screw blank and washer to the thread-rolling dies. The guide chute 406 (Figs. 4 and 25) comprises a beveled guide block 408, having its beveled surface in alinement with the lower end of the guide chute 18 and secured to the body casting 4 by any suitable bracket (not shown). A beveled cover plate 410 is secured to the top surface of the block 408 and in a recess in the upper edge of the fixed guide bar 236, the cover plate 410 being in horizontal alinement with the upper edge of the adjustable guide bar 238 and the beveled surface of the cover plate being in vertical alinement with the beveled surface of the guide block 408. The rear beveled surfaces of the block 390 and immovable die 22 cooperate with the guide block 408 and cover plate 410 in forming the guide chute 406, and the outer edge of the guide chute 406 is in alinement with the outer edge of the die 22.

The transfer mechanism 24, as shown in Figs. 4, 25 and 26, comprises a slide plate 412 mounted in guideways formed in a fixed supporting plate 414 secured to the body casting 4 in any convenient manner. At its outer end the slide plate carries a cam roller 416 journaled thereon by a stud 418, and the cam roller cooperates with a cam 420 secured to the under side of the reciprocating member or gate 312 for movement therewith. Passing through an aperture in an upstanding portion of the slide plate 412 is a guide rod 422, and this rod is threaded at one end into an upstanding lug 424 of a casting 426 bolted on the outer end of the supporting plate 414. A spring 428 surrounds the guide rod 422 and at its opposite ends bears against the lug 424 of the casting 426 and the upstanding portion of the slide plate 412. The spring 428 moves the slide plate inwardly and the cam 420 moves it outwardly against the action of the spring.

For locking the slide plate 412 against forward movement under action of the spring 428, a plunger 430 is provided, and this plunger is rotatably mounted in a boss 432 projecting from the surface of the slide plate. To the top of the plunger is fixed an operating knob 434 for rotating the plunger rod and moving the same upwardly against the action of a spring 436 mounted in an aperture in the boss 432 and plate 412. The spring 436 surrounds the body of the plunger and engages at its opposite ends against the boss 432 and a shoulder formed by the enlarged head 437 formed at the lower end of the plunger. The enlarged head 437 of the plunger is adapted to be inserted, in the rearward position of the slide plate, in an aperture 438 formed in the supporting plate 414. The plunger 430 is provided with a laterally extending pin 440 which is adapted to engage in one or the other of intersecting notches 442 and 444, which are cut into the boss 432 at right angles to each other, the notch 444 being of less depth than the notch 442. The pin 440 coacts with the notches 442 and 444 to prevent rotation of the plunger rod in either of its settings.

A transfer and stop arm 446, which is adapted to engage the shank of the screw blank beneath the washer, is mounted upon the slide plate 412 by a bracket 448. The bracket 448 is provided with a guide projection 450 which engages in the guide slot extending laterally of the slide plate 412, and the bracket 448 is secured to the plate 412 by a bolt 452 passing through an enlarged aperture in the bracket 448 for the purpose of permitting lateral adjustment of the bracket 448 and transfer arm 446 with regard to the slide plate. The transfer or stop arm 446 is secured to the upstanding leg of the bracket 448 by a bolt 454 passing through an enlarged aperture in the bracket, and a set screw 456, threaded in the arm of the bracket at right angles to the bolt 454, bears against said bolt and provides a means for adjusting the transfer or stop arm longitudinally of the slide plate.

A bell crank lever 458 is pivotally secured by a stud 460 to a rearwardly and upwardly extending arm of the bracket 448. The stud 460 is provided with a collar 462 of reduced diameter, about which is wound the convolutions of a spring 464, one end of the spring engaging a pin 466 carried at the lower end of the vertical arm 468 of the bell crank, and the other end of the spring engages a pin 470 mounted on the lower end of the bracket 448.

A transfer or register finger 472, which is adapted to rest on the top of the screw head during the inward stroke of the slide plate, is slidably mounted in the horizontal arm 474 of the bell crank 458. A special stud 476, which passes through an enlarged opening in the arm 474, is threaded to engage a nut 478 for securing the finger 472 to the arm 474. The special stud 476 is provided with a flattened head 480, which is threaded to receive a set screw 482, the set screw 482 projecting beneath the head 480 to engage the bracket 448 and limit the downward movement of the arm 474 of the bell crank. A set screw 484, threaded through a bracket 486 upstanding from the supporting plate 414, is adapted to engage the vertical arm 468 of the bell crank 458 to rotate said bell crank and lift the register finger 472 to permit the foremost washer and screw blank assembly in the guide chute 18 to move in front of the transfer or stop arm 446 when the slide plate 412 is in its rearward position. A set screw 488, threaded into the front face of the bracket 448, is adapted to engage the outer surface of the adjustable guide bar 238 to limit the forward movement of the slide plate 412.

The operation of the transfer mechanism is as follows. As the reciprocating die 20 moves forwardly to roll the threads on a blank held between that die and the die 22, the inclined surface of the cam 420 will engage the roller 416 and force the slide plate 412 rearwardly against the action of the spring 428. In the rearmost position of the slide plate the front edge of the transfer or stop arm 446 will be in alinement with the inner edge of the adjustable guide bar 238 and the register finger 472 will have been rotated clockwise by the set screw 484 a sufficient distance to permit the screw blank and washer to gravitate into the guide chute 406.

As the reciprocating die and the cam 420 move rearwardly, the spring 428 will urge the slide plate 412 forwardly and the spring 464 will force the register finger into tight engagement with the head of the screw blank and, the stop arm 446 being in engagement with the shank of the bolt, the bolt will be moved longitudinally of the chute 406 to its proper position centrally of the space between the dies 20 and 22. The transfer or stop arm 446 and the transfer or register finger 472 cooperate to maintain the screw blank and washer in upright position, and during this transfer movement prevent a preceding blank from gravitating into the guide chute 406.

The starter mechanism

This starter mechanism comprises the slide bar 338, which, as previously described, is mounted in guideways formed by brackets 237 and the cover or guide bar 332. This slide bar carries at its forward end a forwardly projecting start finger 490 alined centrally of the space between the dies 20 and 22 and terminated a slight distance to the rear of the guide chute 406. The starter slide bar is operated from a shaft 492 by a slotted crank 494 (Fig. 6), into the slot of which projects a pivot stud 496 mounted on the rear end of the slide bar.

The purpose of this starting mechanism is to assist the blanks to enter the dies, which, in the conventional manner, are beveled inwardly at their rear ends to facilitate the insertion of said blanks. The starter slide bar 338 also provides means for operating, in the manner previously described, the pivoted lever 328 which controls the opening movements of the jaws 302 and 304 of the assembly mechanism. The forward movement of the starter slide bar 338 is limited by an adjustable set screw 498, threaded into the rear of the cover plate 332, which engages the crank 494 and limits its forward rotation.

The driving mechanism

Figure 5:
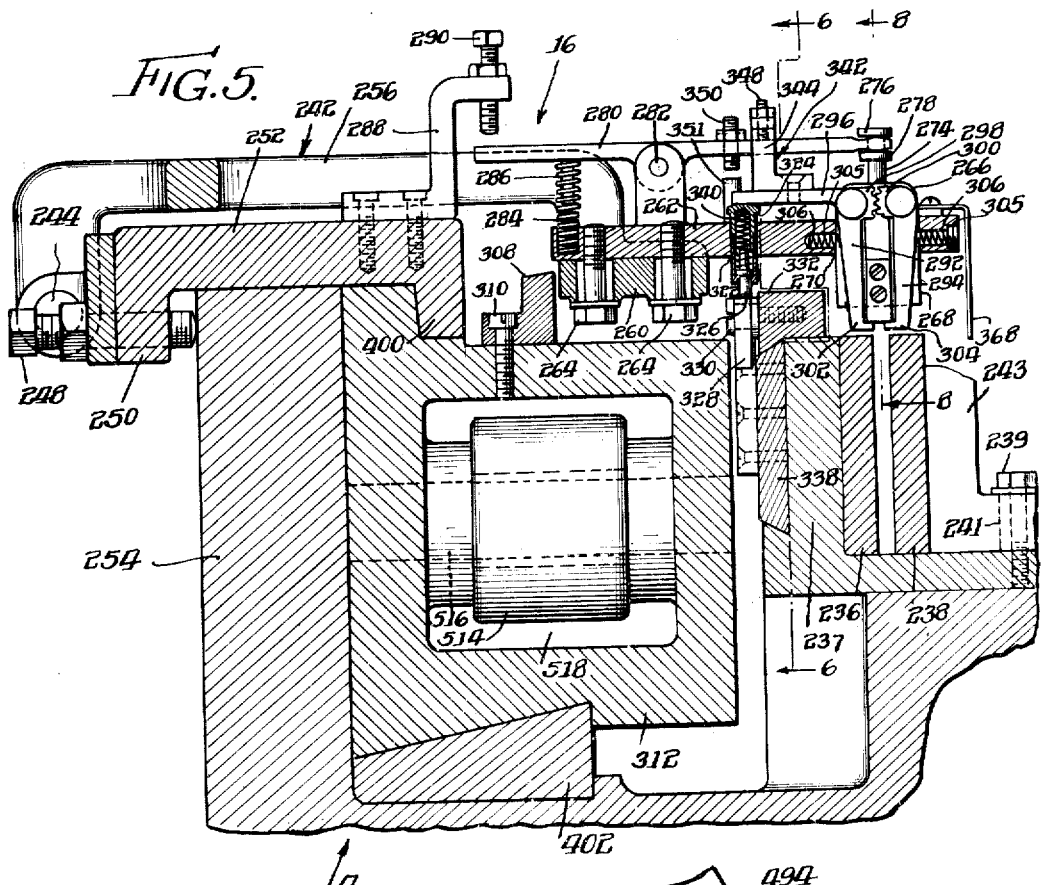
Fig. 5 is a vertical section taken along the line 5—5 of Fig. 4.

The driving mechanism comprises a fly wheel 500 secured to the outer end of a shaft 502 journaled in an arm 504 projecting rearwardly from the body casting 4, and the flywheel is driven by an electric motor (not shown) through the intermediary of a belt 506. To the inner end of the shaft 502 is secured a gear 508 which meshes with a gear 510 secured to the inner end of the shaft 512 journaled in the rearwardly extending portion 504 of the body 4. A pitman 514 is pivotally connected at one end to the body portion of the gear 510, and at its other end is pivotally connected by a pin 516 in a central opening 518 in the reciprocatory member or gate 312 (Fig. 5).

On the outer end of the shaft 512 there are secured a starter slide control cam 520 and a gear 522. The gear 522 meshes with a gear 524 mounted on the outer end of a shaft 526 journaled in the portion 504 of the body 4. A hopper crank plate 528 and a gear 530 are secured to the inner end of the shaft 526 and the crank plate 528 is connected by a link 532 to the reciprocating plate 42 of the screw blank feed mechanism 10, and the gear 530 is connected by a chain 534 to a gear 536 secured to the washer feed control shaft 184. The starter slide control cam 520 rotatably engages a cam roller 538 carried by a lever 540 which is pivoted by a pin 542 to the portion 504 of the casting 4.

The lever 540 has pivoted thereto at its outer end, a block 544. The block 544 is apertured to loosely receive a connecting rod 546 which is secured to the block by suitable nuts engaging the opposite surfaces thereof. The other end of the connecting rod 546 is connected in a similar manner to a crank arm 548 secured to the outer end of the starter drive shaft 492 which is journaled in the bracket 62. The cam roller 538 is maintained in engagement with the cam 520 and the lever 540 urged in a clockwise direction to move the starter slide bar 338 forwardly by a spring 550 connected at one end to said lever and at the other end to the portion 504 of the body casting 4. The shaft 60, which operates the clearing device 44, is driven by a sheave 552 mounted on the outer end thereof, and this sheave is driven by a belt 554 which passes around a sheave 556 secured to the inner end of the shaft 502.

The operation of the driving mechanism is as follows. In the operation of the driving mechanism the gear 510 rotates to move the reciprocatory member or gate 312 forwardly and at the beginning of the forward movement the cam roller 538 engages the portion of the cam 520 which is of less radius and the spring 550, acting upon the lever 540, moves the connecting rod 546 and crank 548 forwardly to oscillate the shaft 492 counterclockwise. Upon such counterclockwise oscillation of the shaft 492, the crank 494 will be oscillated clockwise (as seen in Fig. 6) to move the starter slide 338 forwardly and the starter finger 490 secured thereto will be moved forwardly to force the blank between the dies 20 and 22.

The operation of the remaining parts of the driving mechanism in reciprocating the feed plate 42, in operating the drive shaft 184 of the washer feed mechanism, and in rotating the clearing device 44 of the screw blank feeding mechanism, will be apparent from the above detailed description of this driving mechanism and need not be repeated.

Operation of the machine

In the operation of the machine, screw blanks are fed from the hopper or container 6 by the reciprocating plate 42 and the clearing wheel 44 to the inclined guide chute 12. The reciprocating plate 42 and the clearing wheel 44 are continuously operated by the driving mechanism 28 in the manner previously described. The screw blanks pass down the inclined guide chute 12 under the action of gravity and are delivered by said chute to the assembly mechanism 16. The spring pressed plunger rod 354 engages the screw blank positioned therebeneath and controls the delivery of blanks to the assembly mechanism by frictionally binding that screw blank to the guide chute. The plunger rod 354 is operated by the cam 364, carried by the assembly mechanism, into engagement with a screw blank to remove the combined weight of the screw blanks above the plunger rod from the assembly mechanism during the time that the jaws 302 and 304 are opened to receive a screw blank therebetween. This of course prevents such interference with the proper operation of the assembly mechanism as might otherwise be caused by the frictional forces generated by the weight of the screw blanks acting against said jaws.

Lock washers are first inserted into the cartridge, or magazine, 64; the rod 96 is moved downwardly against the action of the weight 88; and the cartridge 64 is placed thereupon with the end of said rod passing through the bottom end of the cartridge. The upper end of the cartridge is then inserted into the arm 72 to detachably engage the plungers 70 and to be held thereby to said arm 72. In the manner previously described, the washers are selected from this cartridge 64 by the selector pins 142 and are carried by the rotatable selector 124 into position to be engaged by the transfer finger 198. The transfer finger 198 operates to disengage a washer from the foremost pin 142 and to transfer the disengaged washer to the assembly mechanism, the transfer finger holding the washer in alinement with the jaws 302 and 304 until the screw blank held in said jaws has been inserted into the washer. During the time that the jaws 302 and 304 hold a screw blank in the washer, the transfer lever 192 is again operated, but in the reverse direction, to release the washer, which then remains in engagement with the shank of the screw blank.

The assembly mechanism 16 operates, as hereinbefore stated, to pick the foremost screw blank from the guide chute 12; to insert said screw blank into a lock washer as just above stated; and to deposit the assembled unit on the upper end of the inclined guide chute 18 and release it there.

The assembled units gravitate down the inclined guide chute 18 to the transverse guide chute 406, along which last mentioned chute the assembled units are moved by the transfer mechanism 24 into position between the reciprocatory die 20 and the immovable die 22. At the instant that the gate 312 begins to move forwardly to operate the die 20, the starter mechanism 26 is operated to move the starter finger 480 forwardly into engagement with the shank of the screw blank and to push the assembled unit into tight engagement with the dies 20 and 22. The leading edges of the dies 20 and 22 are beveled, as previously stated, for the purpose of facilitating this insertion of the shank of the screw blank between said dies. The reciprocatory die 20 moves forwardly a slight distance beyond the immovable die 22; this carries the assembled unit beyond the end of the die 22 and the unit then drops into a suitable receiving pan.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. The method of assembling a screw having a clamping head with a lock washer, which comprises feeding the screw and washer along different predetermined paths into juxtaposition and alinement, retaining the washer stationary while inserting the screw partially thereinto, releasing the washer, thereafter forcibly pressing the washer and the clamping head of the screw into close juxtaposition and while retaining the washer in such position enlarging the shank of the screw at a point on the opposite side of the washer from the clamping head so that the shank diameter of said screw element at said point exceeds the diameter of the hole in the washer.

2. The method of assembling a screw having a clamping head with a lock washer, which comprises massing a quantity of screw blanks having clamping heads, stacking a quantity of washers, selecting a screw blank from the mass, selecting the top washer from the stack, feeding the screw blank and washer along different predetermined paths into juxtaposition and alinement, retaining the washer stationary while forcibly pressing the screw blank partially thereinto, releasing the washer, forcibly pressing the clamping head of the screw blank into engagement with the washer while the washer is released, temporarily retaining the washer on the screw blank, and, while so retained, rolling threads on the screw blank, beneath the washer, thereby permanently to secure the washer on the screw.

3. In a device of the character described, the combination of a container for screw elements, a second container for washer elements, a mechanism for assembling the screw and washer elements, means for feeding the screw elements from the first container to said assembly mechanism, and means for feeding washer elements from the second container to a predetermined position in juxtaposition to said assembly mechanism, and means for actuating said assembly mechanism to cause it to receive each screw element fed thereto and to carry and insert said element into a washer element at said predetermined position.

4. In a machine for assembling screws and washers, the combination of a container for screw blanks, a container for washers, a mechanism for assembling the screw blanks and washers, means for feeding the screw blanks from the first container to said assembly mechanism, means for feeding the washers from the second container to said assembly mechanism, means for forming on the screw blank, beneath the washer, a thread having an outside diameter exceeding the diameter of the hole in the washer thereby permanently to retain the washer on the screw and means for conveying the assembled blanks and washers to the thread forming means.

5. In a machine for assembling a screw and a washer, a container for screw blanks, a second container for washers, an assembly mechanism, means for feeding the screw blanks from the first container to the assembly mechanism, means for feeding the washers from the second container to the assembly mechanism, thread rolling mechanism, and means for feeding the assembled screw blank and washer from the assembly mechanism to the thread rolling mechanism.

6. In a machine for assembling a screw and washer, a container for screw blanks, a second container for washers, an inclined guide chute, means for selecting screw blanks from the container and depositing them on the inclined guide chute, a second inclined guide chute spaced vertically at its upper end from the first guide chute, means for selecting washers from the second container and depositing them on the second guide chute, an assembly mechanism including means for selecting the foremost screw blank on the first guide chute and inserting the same into the washer on the second guide chute, and means operatively associated with said assembly mechanism for forming on the shank of the screw blank beneath the washer threads having an outside diameter exceeding the diameter of the hole in the washer thereby permanently to retain the washer on the screw.

7. In a machine for assembling screws and washers, means for conveying screw blanks, means for conveying washers, assembly mechanism, thread rolling dies, means for guiding the assembled screw blank and washer from the assembly mechanism to said dies, and starter means for pushing the blanks from the guiding means into engagement with said dies.

8. In a machine for assembling screws and washers, a mechanism for assembling screw blanks and washers, means for guiding screw blanks to the assembling mechanism, means for feeding washers to said mechanism, a shiftable control member operatively associated with said guiding means for feeding one screw blank at a time into said assembly mechanism and means for actuating said shiftable member and said assembly mechanism in proper timed relation.

9. In a device of the character described, a washer feeding mechanism comprising means for receiving a plurality of washers, means normally tending to discharge washers from said receiving means, a releasable washer engaging stop member for preventing discharge of said washers, and means for operating said releasable member to permit the discharge of a single washer under action of said discharge means.

10. In a device of the character described, a washer feeding mechanism comprising means for receiving a plurality of washers, gravity operated means normally tending to discharge washers from said receiving means, releasable means for preventing discharge of said washers, and means for operating said releasable means to permit the discharge of a single washer under the action of said discharge means.

11. In a machine for assembling screw elements and washers, a container for screw elements, a second container for washers, an assembly mechanism, means for feeding screw elements from the first container to said assembly mechanism, means for feeding washers from said second container to said assembly mechanism, and means carried by said assembly mechanism for discharging a washer from said washer feeding means whenever said screw element feeding means fails to deliver a screw element to said assembly mechanism.

12. In a machine for assembling screw elements and washers, a container for screw elements, a second container for washers, an assembly mechanism, means for feeding screw elements from said first container to said assembly mechanism, means for feeding washers from said second container to said assembly mechanism, and means to prevent feeding of a screw element whenever the washer feeding means fails to deliver a washer to said mechanism.

13. In a mechanism for assembling a screw element having a clamping head with a washer element, a shiftable support, means comprising relatively movable members carried by said support for clamping one of said elements thereto, means for moving said members relatively, and means for thereafter shifting said support to cause said washer element to be positioned adjacent the clamping head of said screw element.

14. In a mechanism for assembling screw elements and washers, a shiftable support, means carried by said support for clamping a screw element thereto, means for shifting said support to insert said element into a washer, and means for thereafter operating said clamping means to release said screw element.

15. In a mechanism for assembling a screw element having a clamping head with a washer element, a shiftable support, means carried by said support and engaging the shank of a screw element for clamping the same to said support, means mounted on said support for movement relative thereto and engaging the head of said screw element for preventing relative movement between said clamping means and said screw element longitudinally of said element, means for shifting said support to insert said screw element partially into a washer, and means for moving said head engaging means relative to said support to complete the insertion of said screw element into said washer.

16. In a mechanism for assembling a screw element and a washer element, a shiftable support, a plurality of levers forming jaws for engaging a screw element, said levers being pivotally secured to said shiftable support for movement therewith to insert a screw element into a washer element and for movement relative thereto into positions to receive, to clamp and to release a screw element, means for shifting said shiftable support, means actuated upon movement of said shiftable support in one direction for rotating said levers and moving said jaws a predetermined degree to receiving position, spring means for rotating said levers and moving said jaws into clamping position upon movement of said shiftable support in the opposite direction, said levers being movable with said support to insert the clamped screw element into a washer element, and means, thereafter operable, for rotating said levers and moving said jaws into releasing position.

17. In a device of the character described, a supply of screw elements, a supply of washer elements, an assembly mechanism, guide means for receiving and delivering a line of screw elements to said mechanism, means for delivering washer elements to said assembly mechanism, and a second guide means for conveying assembled units of washer and screw elements from said assembly mechanism, said assembly mechanism comprising a shiftable support, means carried by said support for controlling the delivery of screw elements to said mechanism from said first guide means, a plurality of levers forming jaws for engaging a screw element, said levers being pivotally secured to said shiftable support for movement therewith to insert a screw element into a washer element and for movement relative thereto into positions to receive, to clamp and to release a screw element, means for shifting said shiftable support, means actuated upon movement of said shiftable support in one direction for rotating said levers and moving said jaws a predetermined degree to receiving position, spring means for rotating said levers and moving said jaws into clamping position upon movement of said shiftable support in the opposite direction, said levers being movable with said support to insert the clamped screw element into a washer element, and means, thereafter operable, for rotating said levers to move said jaws into releasing position and deliver the assembled unit to said second guide means.

18. In a machine for assembling screws and washers, the combination of a container for screw blanks, a container for washers, a mechanism for assembling the screw blanks and washers, means for feeding screw blanks from the first container to said assembly mechanism, means for feeding washers from the second container to said assembly mechanism in proper position and alinement for assembly with the screw blanks, and means operatively associated with the assembly mechanism for rolling on the shank of the screw blank beneath the washer a thread having an outside diameter exceeding the internal diameter of the washer, thereby permanently to retain the washer on the screw.

19. In a machine for assembling a screw and a washer, a container for screw blanks, a second container for washers, an assembly mechanism, means for feeding screw blanks from the first container to the assembly mechanism, means for feeding washers from the second container to the assembly mechanism, thread rolling mechanism, means for feeding the assembled screw blank and washer from the assembly mechanism to the thread rolling mechanism, and driving mechanism for said feeding means, said assembly mechanism and said thread rolling mechanism.

20. In a machine for assembling a screw and washer, a container for screw blanks, a second container for washers, an assembly mechanism, an inclined guide chute between one of said containers and said assembly mechanism, a thread rolling mechanism, a second inclined guide chute between said assembly mechanism and said thread rolling mechanism, said second guide chute at its upper end being spaced vertically from the lower end of the first guide chute, means for selecting screw blanks from the first container and depositing them on the first guide chute, means for selecting washers from the second container and depositing them on the second guide chute, and means included in said assembly mechanism for transferring the foremost screw blank from said first guide chute to said second guide chute in position and alinement with the washer for assembly therewith.

21. In a machine for assembling screws and washers, means for feeding screw blanks, means for feeding washers, an assembly mechanism receiving said blanks and washers from said feeding means and assembling the same, means for conveying the assembled screw blank and washer from the assembling mechanism, a thread rolling mechanism, and means for transferring the assembled screw blank and washer from the conveying means to the thread rolling mechanism.

22. In a device of the character described, a washer feeding mechanism comprising a magazine for receiving a plurality of washers, means normally tending to discharge washers from said receiving means, a releasable wedge in said magazine for preventing discharge of said washers, and spring operating means for operating said releasable wedge to permit the discharge of a single washer under the action of said discharge means.

23. In a device of the character described, a supply of screw elements, a supply of washer elements, an assembly mechanism, guide means for receiving and delivering a line of screw elements to said mechanism, and means for delivering washer elements to said assembly mechanism, said assembly mechanism comprising a shiftable support, means carried by said support for controlling the delivery of screw elements from said guide means to said mechanism, additional means carried by said support for receiving a screw element from said delivery controlling means, and means for shifting said support to cause said receiving means to insert the screw element into a washer element.

24. In a device of the character described, a supply of screw elements, a supply of washer elements, an assembly mechanism, guide means for receiving and delivering a line of screw elements to said mechanism, means for delivering washer elements to said assembly mechanism, and a second guide means for conveying assembled units of washer and screw elements from said assembly mechanism, said assembly mechanism comprising a shiftable support, means carried by said support for controlling the delivery of screw elements to said mechanism, additional means carried by said support for receiving a screw element from said delivery controlling means, and means for shifting said support to cause said receiving means to insert the screw element into a washer element and deliver the assembled unit to said second guide means.

25. The combination with thread-rolling dies, of automatic means for inserting a headed screw blank in a washer, automatic means for transferring the assembled screw and washer to the thread-rolling dies, and means for maintaining the washer and the head of the blank in association with each other during such transfer.

26. The combination with thread-rolling dies, of automatic means for feeding to said dies headed screw blanks inserted in washers, and means for holding each washer in association with the head of the blank during such feeding.

27. The combination of a pair of thread rolling dies, automatic means for telescoping a screw blank and a washer, automatic means for placing the assembled unit in the dies with the washer in contact with the outer surfaces of the dies so that it bridges the space between them, and automatic means for actuating the dies to roll a thread on the screw blank while the washer is carried by the dies.

28. The method of making combined screw and washer units which comprises successively feeding headed screw elements bodily and transversely with respect to their axes to a first station while holding each element against axial movement, successively feeding washers along a predetermined path to a second station in juxtaposition to the first station, inserting the shank of the leading screw element at the first station into the leading washer at the second station by relatively shifting the screw element and the washer axially until the washer is positioned adjacent the head of the screw element, and, while so retained, extruding the material of the shank of the screw element at a point beyond the exposed side of the washer so that the washer is retained between the head and the extruded portion of the shank of the screw element.

29. In a machine for manufacturing combined screw and washer units, a container for screw elements, a second container for washer elements, means for positioning a washer adjacent the head of each screw element, means for feeding the screw elements from the first container to the positioning means, means for feeding the washers from the second container to the positioning means, a mechanism for extruding the metal of the screw element at a point beyond the free side of the washer so that the washer is retained between the head and the extruded portion of the screw element, and means for feeding each assembled screw and washer unit from the positioning means to the extruding mechanism.

30. In a machine for manufacturing combined screw and washer units, a first container for screw elements, a second container for washers, an assembly mechanism, automatic means for feeding the screw elements from the first container to the assembly mechanism and for feeding the assembled screw and washer units away from the assembly mechanism, said automatic feeding means including an inclined guide chute having an upper portion for feeding the screw elements into the assembly mechanism and a lower portion for receiving the screw elements from the assembly mechanism and means for discharging screw elements from the first container onto the upper portion of the inclined guide chute, means for discharging washers from the second container and for feeding them to the assembly mechanism, said assembly mechanism including means receiving the foremost screw element from the upper portion of the guide chute for inserting the same into a washer, said washer feeding means including means for preventing movement of the washer during insertion of the screw element and releasing the same thereafter, and means receiving the foremost assembled screw and washer unit from the lower portion of the inclined guide chute for extruding the metal of the screw element at a point beyond the free side of the washer so that the washer is retained between the head and the extruded portion of the screw element.

31. A mechanism for assembling screw elements and washers, a guide chute for feeding screw elements to the assembling mechanism, said assembling mechanism receiving the foremost element from said guide chute, means for feeding washers to said mechanism, a shiftable stop member for holding the screw elements in said guide chute during movement of the assembling mechanism and means for shifting said stop member in timed relation to the movement of the assembling mechanism to release the foremost screw element.

32. In a mechanism for assembling screw elements with washers, a shiftable support, means carried by said support for engaging the shank and head of a screw element for clamping the same to said support and for preventing axial movement of said screw element relative to said support, means for shifting said support to insert said screw element into a washer and means for thereafter actuating said clamping means to release said screw element from the shiftable support.

33. In a machine for manufacturing combined screw and washer units, means including an inclined chute for feeding screw elements, means receiving screw elements from said chute for assembling said elements with washers, means for feeding washers to be assembled to the assembling means, a mechanism for extruding the metal of the screw element beyond the free side of the washer so that the washer is retained between the head and the extruded portion of the screw element, and means for feeding the assembled screw and washer units from the assembling means to the extruding mechanism, said feeding means comprising a second inclined chute and means for depositing the assembled units on said second guide chute.

34. In a machine for assembling screws and washers, means for feeding headed screw elements, means for feeding washers, an assembly mechanism receiving said screw elements and washers from said feeding means and assembling the same, means for conveying the assembled screw element and washer unit from the assembly mechanism, a mechanism for extruding the metal of the screw element on the free side of the washer so that the washer is retained between the head and the extruded portion of the screw element, and means for transferring the assembled screw element and washer from the conveying means to the extruding mechanism.

35. In combination, an extruding mechanism, automatic means for feeding said extruding mechanism headed screw elements inserted in washers and means for holding each washer in position adjacent the head of its complementary screw element during such feeding, said extruding mechanism including means engageable with the shank of each screw element for extruding the metal of the screw element at a point beyond the free side of the washer so that the washer is retained between the head and the extruded portion of the screw element.

36. A machine for manufacturing combined screw and washer units comprising a mechanism for positioning a washer on a screw element adjacent the clamping head of said element and mechanism operatively associated with said positioning mechanism for thereafter enlarging the shank of the screw element at a point on the opposite side of the washer from the head of the screw element so that the diameter of said screw element at said point exceeds the diameter of the hole in the washer.

37. Attachments for a thread forming machine having means for feeding screw blanks to a thread forming mechanism, said attachments comprising means for extracting screw blanks from said feeding means, means for assembling said extracted blanks with washers, and means for returning the assembled blanks and washers to said feeding means in advance of the thread forming mechanism.

38. Attachments for a thread forming machine according to claim 37, including a washer container and means for feeding washers from the container to the assembling means.

39. Attachment for a thread-forming machine which has thread-forming mechanism, a container for screw blanks and means for feeding screw blanks from the container to the thread-forming mechanism, said attachment comprising automatic means for placing a washer on each screw blank at an intermediate point of its travel from the container to the thread-forming mechanism.

40. Attachments for a thread-rolling machine having means including a slotted guide for feeding screw blanks from a container to a thread-rolling mechanism, said attachments comprising means for removing each screw blank from said guide at a point between the container and the thread-forming mechanism, means for assembling the removed blank with a washer, and means for placing the assembled blank and washer on the guide with the washer resting on the guide at a point between the first mentioned point and the thread-forming mechanism.

41. In a machine for assembling screws and washers, the combination of a container for screw blanks, a container for washers, a mechanism for assembling screw blanks and washers, thread-rolling mechanism for rolling on the shank of each screw blank beneath the washer a thread having an outside diameter exceeding the internal diameter of the washer, means for feeding the screw blanks from the first container to said assembly mechanism, means for feeding the washers from the seond container to said assembly mechanism, means for feeding assembled screw blanks and washers from the assembly mechanism to the thread-rolling mechanism, and a common driving mechanism actuating said three feeding means, said assembly mechanism and said thread-rolling mechanism is timed relation.

42. In a machine for assembling screws and washers, means for feeding screw blanks, means for feeding washers, an assembly mechanism receiving said blanks and washers from said feeding means, means for conveying the assembled screw blanks and washers from the assembly mechanism, a thread-rolling mechanism comprising a movable die and a stationary die receiving the assembled blanks and washers from said conveying means, and means for operating said movable die and said assembly mechanism.

43. A machine for making assembled screws and washers comprising a container for screw blanks, a container for washers, thread-rolling dies, coordinated means for feeding screw blanks from the screw blank container and washers from the washer container along separate predetermined paths to a point of assembly where each screw is telescoped with a washer, and interconnected means for feeding the screw blanks and washers along a common path from the point of assembly to the thread rolling dies.

44. In a machine for making screw and washer units, the combination with thread-rolling dies, and a screw blank container of an interrupted slotted guide for supporting and guiding screw blanks from said container to said thread-rolling dies, means for moving screw blanks across the interruption in said guide, and means for moving washers to the upper surface of the guide beyond the interruption, said screw-moving means and said washer-moving means being coordinated to telescope each screw with a washer.

45. Mechanism for assembling screw elements and washers comprising the combination with a slotted guide for supporting and guiding screw elements, of means for placing a washer on said guide with its hole in alignment with the slot in the guide, and means for inserting the shank of a screw element through the hole in the washer and the slot in the guide.

46. Mechanism for assembling screw elements and washers comprising the combination of a slotted guide for supporting and guiding screw elements, washer-engaging means, screw-engaging means, means for moving the washer-engaging means to place a washer held thereby on said guide with its hole in alignment with the slot in the guide, and means for moving said screw-engaging means to insert the shank of a screw element held thereby through the hole in the washer and the slot in the guide, said washer-engaging means and screw-engaging means being withdrawn after assembly so that the assembled screw and washer are free to move along the guide as a unit with the washer resting on the guide and the shank of the screw element projecting into the slot in the guide.

47. Mechanism for assembling screw elements and washers comprising the combination with a slotted guide for supporting and guiding screw elements, of means for moving a washer to a position on said guide with its hole in alignment with the slot in said guide, and means for moving a screw element to a position in which its shank extends into the slot in said guide, said screw-moving means and said washer-moving means being coordinated to telescope the screw and washer.

48. Mechanism for assembling screw elements and washers comprising the combination of first and second slotted guides, the rear end of the first guide being located above the front end of the second guide, means for positioning a washer on the second guide near its front end with the hole of the washer in alignment with the slot in said guide, means for moving a screw element from the rear end of the first guide to the front end of the second guide, and means guiding the shank of the moving screw element into the hole in the washer.

49. In a mechanism for assembling a screw element and washer, the combination of first and second slotted guides, the rear end of the first guide overlapping the front end of the second guide, means for positioning a washer on the second guide near its front end with the hole of the washer in alignment with the slot in said guide, a plunger for engaging the head of a screw element to push it from the rear end of the first guide to the front end of the second guide, and means for guiding the shank of the moving screw element into the hole in the washer.

50. In a mechanism for assembling a screw element and washer, the combination of first and second slotted guides, the rear end of the first guide terminating adjacent the front end of the second guide, means for positioning a washer on the second guide near its front end with the hole of the washer in alignment with the slot in said guide, a plunger for engaging the head of a screw element to push it into the washer at the front end of the second guide, and means for guiding the shank of the moving screw element into the hole in the washer.

51. A mechanism for assembling a screw element and a washer comprising means for placing the washer in a predetermined position, a movable support engaging the under surface of the head of a screw element to hold it in alignment with a washer in said position, a plunger positioned to engage the head of the screw element, means for moving the plunger to push the screw element toward the washer until the under surface of the head of the screw element rests on the washer, and means for withdrawing the support from engagement with the under surface of the head of the screw element during such movement of the plunger.

52. A mechanism for assembling a screw element and a washer comprising the combination of a washer holder containing an open recess for engaging the periphery of a washer, a screw holder having means for engaging the under surface of the head of the screw element, and automatic means for causing a relative approaching movement between the screw holder and the washer holder along the axis of a screw element held in a screw holder to telescope the screw element with a washer held in the washer holder, said automatic means being operable thereafter for causing relative separating movements between the assembled screw element and the screw holder on the one hand and the washer and the washer holder on the other hand in directions transverse to the axis of the screw element.

53. In a device of the character described, a washer feeding mechanism comprising a container for washers, a resilient pin for engaging the inner periphery of a washer, resilient jaws for engaging the outer periphery of a washer, automatic means for moving the pin to insert it in a washer in the container and to carry the washer out of the container, and automatic means for moving the jaws into engagement with a washer held on the pin, said first automatic means being operable thereafter to withdraw the pin from the washer while it is held by the jaws.

54. A mechanism for assembling screw elements and washers comprising a washer-positioning member having an open recess to engage the edge of a washer, means for inserting the shank of a screw element into a washer in said recess, means operable thereafter for laterally moving said washer-positioning member to withdraw its open recess from engagement with the edge of the washer, and means engaging the shank of the screw element to prevent the washer from following such withdrawal movement of the recess.

55. A mechanism for assembling screw elements and washers comprising a slotted guide, a washer-moving member having an open recess to engage the edge of a washer, means for actuating said member to move its recess across said guide to bring it into and out of register with the slot in the guide, and means for inserting the shank of a screw element in a washer held in the recess while it is in register with the slot so that the engagement of the shank of the screw element within the slot of the guide prevents the washer from following the withdrawal movement of the recess.

56. In a machines for assembling screw elements and washers, means for feeding screw elements, means for feeding washers, means for assembling the screw elements and washers, means for receiving assembled screw elements and washers, and mechanism for preventing the delivery of washerless screw elements to said receiving means.

57. In a machine for assembling screw elements and washer elements, the combination of separate members for moving screw elements and washer elements into co-related, predetermined positions, automatic means for operating one of said members at regular intervals, and automatic means for operating the other of said members only after the first member has placed an element in one of said co-related positions.

58. In a machine for assembling screw elements and washers, means for placing a washer in a predetermined position, a feeler adapted to engage a washer placed in said position, and means for inserting the shank of the screw element in a washer controlled by said feeler to operate only when a washer is in said position.

WALTER M. HANNEMAN.

CERTIFICATE OF CORRECTION.

Patent No. 2,152,591. March 28, 1939.

WALTER M. HANNEMAN.

It is hereby certified that error appears in the printed specification of the above numbered patent requiring correction as follows: Page 2, first column, line 10, for the word "bank" read --blank--; page 4, first column, line 53, for "tarnsfer" read --transfer--; and second column, line 66, for "arms 526" read --arms 256--; page 5, first column, line 15, for "The" before "alined" read --From--; page 12, second column, line 42, claim 41, for "seond" read --second--; line 48, same claim, for "is" read --in--; page 13, second column, line 74, claim 56, for "machines" read --machine--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.

ments, means for feeding washers, means for assembling the screw elements and washers, means for receiving assembled screw elements and washers, and mechanism for preventing the delivery of washerless screw elements to said receiving means.

57. In a machine for assembling screw elements and washer elements, the combination of separate members for moving screw elements and washer elements into co-related, predetermined positions, automatic means for operating one of said members at regular intervals, and automatic means for operating the other of said members only after the first member has placed an element in one of said co-related positions.

58. In a machine for assembling screw elements and washers, means for placing a washer in a predetermined position, a feeler adapted to engage a washer placed in said position, and means for inserting the shank of the screw element in a washer controlled by said feeler to operate only when a washer is in said position.

WALTER M. HANNEMAN.

CERTIFICATE OF CORRECTION.

Patent No. 2,152,591. March 28, 1939.

WALTER M. HANNEMAN.

It is hereby certified that error appears in the printed specification of the above numbered patent requiring correction as follows: Page 2, first column, line 10, for the word "bank" read --blank--; page 4, first column, line 53, for "tarnsfer" read --transfer--; and second column, line 66, for "arms 526" read --arms 256--; page 5, first column, line 15, for "The" before "alined" read --From--; page 12, second column, line 42, claim 41, for "seond" read --second--; line 48, same claim, for "is" read --in--; page 13, second column, line 74, claim 56, for "machines" read --machine--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.